(12) United States Patent
Kim (10) Patent No.: US 10,567,132 B2
(45) Date of Patent: Feb. 18, 2020

(54) METHOD AND DEVICE FOR TRANSMITTING AND RECEIVING DISCOVERY SIGNAL

(71) Applicant: INDUSTRY-UNIVERSITY COOPERATION FOUNDATION HANYANG UNIVERSITY, Seoul (KR)

(72) Inventor: Sun Woo Kim, Seoul (KR)

(73) Assignee: INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 17 days.

(21) Appl. No.: 15/306,304

(22) PCT Filed: Feb. 5, 2015

(86) PCT No.: PCT/KR2015/001173
§ 371 (c)(1),
(2) Date: Oct. 24, 2016

(87) PCT Pub. No.: WO2015/163568
PCT Pub. Date: Oct. 29, 2015

(65) Prior Publication Data
US 2017/0048917 A1    Feb. 16, 2017

(30) Foreign Application Priority Data

Apr. 24, 2014 (KR) .................. 10-2014-0049214
Jul. 30, 2014 (KR) .................. 10-2014-0097010

(51) Int. Cl.
*H04L 5/00* (2006.01)
*H04W 48/16* (2009.01)
*H04W 84/04* (2009.01)

(52) U.S. Cl.
CPC .......... *H04L 5/0048* (2013.01); *H04L 5/0053* (2013.01); *H04W 48/16* (2013.01); *H04W 84/045* (2013.01)

(58) Field of Classification Search
CPC .... H04L 5/0048; H04L 5/0053; H04W 48/16; H04W 84/045
See application file for complete search history.

(56) References Cited

U.S. PATENT DOCUMENTS

| 2014/0064203 A1* | 3/2014 | Seo | ............. H04W 28/06 370/329 |
| 2015/0029919 A1* | 1/2015 | Han | ............. H04W 48/16 370/311 |

(Continued)

FOREIGN PATENT DOCUMENTS

CN          102598777 A       7/2012

OTHER PUBLICATIONS

3GPP TSG RAN WG1 Meeting #76bis R1-141186, Mar. 31-Apr. 4, 2014.

(Continued)

*Primary Examiner* — Peter P Chau (57) ABSTRACT

The present invention relates to: a method by which a small cell having a relatively narrow cell range changes to an active state in an environment in which the small cell is arranged; and a method and a device by which a terminal detects a small cell base station in an inactive state. According to one embodiment of the present invention, provided are a method and a device by which a terminal measures a discovery signal, the method comprising the steps of: receiving a discovery signal from a small cell base station in an inactive state; and measuring the discovery signal on the basis of a reference signal of the discovery signal comprising a primary synchronization signal (PSS), a secondary (Continued)

synchronization signal (SSS) and a cell-specific reference signal (CRS).

8 Claims, 9 Drawing Sheets

(56) References Cited

U.S. PATENT DOCUMENTS

| | | | | |
|---|---|---|---|---|
| 2015/0092768 A1* | 4/2015 | Ng | H04W 48/16 | 370/350 |
| 2015/0172950 A1* | 6/2015 | Chen | H04W 16/14 | 370/252 |
| 2015/0223149 A1* | 8/2015 | Liu | H04W 48/12 | 370/252 |
| 2015/0223245 A1* | 8/2015 | Cheng | H04W 48/16 | 370/329 |
| 2015/0249972 A1* | 9/2015 | You | H04L 5/001 | 370/254 |
| 2015/0264636 A1* | 9/2015 | Han | H04W 48/16 | 370/252 |
| 2015/0264699 A1* | 9/2015 | Fwu | H04L 5/0001 | 370/329 |
| 2015/0271738 A1* | 9/2015 | Cheng | H04W 16/24 | 455/422.1 |
| 2015/0282080 A1* | 10/2015 | Maattanen | H04W 52/0216 | 370/311 |
| 2015/0365152 A1* | 12/2015 | Frenne | H04B 7/0626 | 370/252 |
| 2016/0066255 A1* | 3/2016 | Marinier | H04W 48/16 | 370/350 |
| 2016/0150431 A1* | 5/2016 | Zhang | H04W 48/16 | 370/252 |
| 2016/0218816 A1* | 7/2016 | Horiuchi | H04L 5/005 | |
| 2016/0226640 A1* | 8/2016 | Seol | H04B 7/26 | |
| 2016/0227602 A1* | 8/2016 | Yi | H04W 48/16 | |
| 2016/0330789 A1* | 11/2016 | Goto | H04W 48/18 | |
| 2016/0360437 A1* | 12/2016 | Larsson | H04W 24/10 | |
| 2016/0366576 A1* | 12/2016 | You | H04J 11/0069 | |
| 2017/0013490 A1* | 1/2017 | Lunttila | H04W 24/10 | |
| 2017/0078953 A1* | 3/2017 | You | H04L 5/0048 | |

OTHER PUBLICATIONS

3GPP TSG RAN WG1 Meeting #76bis R1-141125, Mar. 31-Apr. 4, 2014.
3GPP TSG RAN WG1 Meeting #76bis R1-141127, Mar. 31-Apr. 4, 2014.
Huawei et al., "Network assistance for small cell discovery", R1-141127, 3GPP TSG RAN WG1 Meeting #76bis, Mar. 31-Apr. 4, 2014, pp. 1-3, Shenzhen, China.
CATT, "Design of discovery signal for small cells", R1-141186, 3GPP TSG RAN WG1 Meeting #76bis, Mar. 31-Apr. 4, 2014, pp. 1-6, Shenzhen, China.
Huawei et al., "Reference signals for enhanced cell discovery", R1-141124, 3GPP TSG RAN WG1 Meeting #76bis, Mar. 31-Apr. 4, 2014, pp. 1-6, Shenzhen, China.
NEC, "Small cell discovery signal design", R1-141203, 3GPP TSG RAN WG1 Meeting #76bis, Mar. 31-Apr. 4, 2014, pp. 1-4, Shenzhen, China.
Intel Corporation, "Discussion on small cell discovery signal", R1-141156, 3GPP TSG RAN WG1 Meeting #76bis, Mar. 31-Apr. 4, 2014, pp. 1-5, Shenzhen, China.
International Search Report for International Patent Application No. PCT/KR2015/001173, filed on Feb. 5, 2015.
Ericsson, R1-135663, On the Design of discovery signals, 3GPP TSG RAN WG1 #75, 3GPP (Nov. 2, 2013).
Alcatel-Lucent et al., R1-141246, Discovery Signals Design for Small Cell On/Off 3GPP TSG RAN WG1 #76bis, 3GPP (Mar. 22, 2014).
NTT DOCOMO, R1-140622, Views on discovery signal design for Rel-12 small cell enhancement, 3GPP TSG RAN WG1 #76, 3GPP (Feb. 1, 2014).
Hitachi Ltd., R1-141395, Discussion on discovery signal candidates, 3GPP TSG RAN WG1 #76bis, 3GPP (Mar. 22, 2014).
Samsung, R1-141287, Discussion on small cell on/off scenarios and procedures, 3GPP MEETINGS_3GPP_SYNC RAN1, 3GPP (Mar. 30, 2014).
Huawei et al., R1-141589, Mechanisms for energy-efficient small cell discovery and measurements, 3GPP TSG RAN WG1 #76bis(Mar. 22, 2014).
Huawei et al., R1-140038, Enhancements of RRM measurements for small cell on/off, 3GPP TSG RAN WG1 #76, 3GPP (Feb. 1, 2014).

* cited by examiner

METHOD AND DEVICE FOR TRANSMITTING AND RECEIVING DISCOVERY SIGNAL

TECHNICAL FIELD

The present invention relates to: a method by which a small cell having a relatively narrow cell range changes to an activation state in an environment in which the small cell is disposed; and a method and a device by which a terminal detects a small cell base station in a deactivation state.

BACKGROUND ART

As communication systems have been developed, various wireless terminals have been utilized by consumers, such as companies and individuals.

A current mobile communication system affiliated with 3GPP, for example, Long Term Evolution (LTE), LTE-Advanced, and the like, requires a high speed and high capacity communication system capable of transmitting and receiving various data, such as image data, wireless data, and the like, beyond providing a sound-based service.

A technique to increase the capacity of a terminal by utilizing a small cell is required for such a high speed and high capacity communication system.

Particularly, a plurality of small cells may be deployed in an adjacent area in order to meet the demand on data of corresponding terminals in an environment where a plurality of terminals are concentrated. In such an environment, a base station which provides a specific small cell may also provide an activation or deactivation function in order to prevent power consumption and minimize interference of a signal.

Meanwhile, it is necessary to define a specific procedure associated with a function by which small cells switch to an activation or deactivation state, and a process by which the terminals check the small cells in a deactivation state.

DETAILED DESCRIPTION OF THE INVENTION

Technical Problem

According to the necessity described above, the present invention provides a specific method and procedure by which a small cell base station in a deactivation state transmits a discovery signal.

In addition, the present invention provides a method and procedure by which a terminal receives a discovery signal in order to check a small cell base station in a deactivation state.

Technical Solution

To achieve the description above, an embodiment of the present invention provides a method and device by which a terminal measures a discovery signal, the method including the steps of: receiving a discovery signal from a small cell base station in a deactivation state; and measuring the discovery signal based on a reference signal of the discovery signal including a Primary Synchronization Signal (PSS), a Secondary Synchronization Signal (SSS), and a Cell specific Reference Signal (CRS).

In addition, an embodiment of the present invention provides a method and device by which a base station transmits a discovery signal, the method including the steps of: configuring a discovery signal including a Primary Synchronization Signal (PSS), a Secondary Synchronization Signal (SSS), and a Cell specific Reference Signal (CRS); and transmitting the discovery signal in a deactivation state of the base station.

Advantageous Effects

In this way, according to the present invention, a terminal can receive a discovery signal, and check whether a small cell base station is activated or whether a small cell base station is present, based on the received discovery signal.

In addition, the state of a corresponding small cell base station is changed to perform communication according to the measurement result of the discovery signal of the terminal, so that an effective use of wireless resources can be provided.

MODE FOR CARRYING OUT THE INVENTION

Hereinafter, some embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

The wireless communication system in the present invention may be widely installed so as to provide various communication services, such as a voice service, packet data, and the like. The wireless communication system may include a User Equipment (UE) and a Base Station (BS or eNB). Throughout the specifications, the user equipment may be an inclusive concept indicating a user terminal utilized in wireless communication, including a User Equipment (UE) in WCDMA, LTE, HSPA, and the like, and a Mobile station (MS), a User Terminal (UT), a Subscriber Station (SS), a wireless device, and the like in GSM.

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), a small cell, and the like.

That is, the base station or the cell, in the present specification, may be construed as an inclusive concept indicating a function or a portion of an area covered by a Base Station Controller (BSC) in CDMA, a Node-B in WCDMA, an eNB or a sector (site) in LTE, and the like, and the concept may include various coverage areas, such as a megacell, a macrocell, a microcell, a picocell, a femtocell, a relay node, an RRH, an RU, a communication range of a small cell, and the like.

Each of the above mentioned various cells has a base station that controls a corresponding cell, and thus, the base station may be construed in two ways. i) The base station may be a device itself that provides a mega cell, a macro cell, a micro cell, a pico cell, a femto cell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives or transmits a signal from a perspective of a terminal or that of a neighboring base station, may be indicated as a base station.

Therefore, a mega cell, a macro cell, a micro cell, a pico cell, a femto cell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technique and technical concepts described in the specifications, and may not be limited to a predetermined term or word. In the specification, the user equipment and the base station are used as two (uplink or downlink) inclusive transceiving subjects to embody the technique and technical concepts described in the specifications, and may not be limited to a predetermined term or word. Here, Uplink (UL) refers to a scheme for a UE to transmit/receive data to/from a base station, and Downlink (DL) refers to a scheme for a base station to transmit/receive data to/from a UE.

Various multiple access schemes may be unrestrictedly applied to the wireless communication system. Various multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like may be used. An embodiment of the present invention may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present invention may not be limited to a specific wireless communication field, and may include all technical fields in which the technical idea of the present invention is applicable.

Uplink transmission and downlink transmission may be performed based on a Time Division Duplex (TDD) scheme that performs transmission based on different times, or based on a Frequency Division Duplex (FDD) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a Physical Downlink Control CHannel (PDCCH), a Physical Control Format Indicator CHannel (PCFICH), a Physical Hybrid ARQ Indicator CHannel (PHICH), a Physical Uplink Control CHannel (PUCCH), an Enhanced Physical Downlink Control CHannel (EPDCCH), and the like, and may be configured as a data channel, such as a Physical Downlink Shared CHannel (PDSCH), a Physical Uplink Shared CHannel (PUSCH), and the like, so as to transmit data.

Meanwhile, control information may be transmitted even using an enhanced PDCCH or extended PDCCH (EPDCCH).

In this specification, a cell may refer to a component carrier, which has the coverage of a signal transmitted by a transmission/reception point or that of a signal transmitted by a transmission point or the transmission/reception point, and the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an "eNB") and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted/received through a PUCCH, a PUSCH, a PDCCH, an EPDCCH, a PDSCH, or the like may be described through the expression, "a PUCCH, a PUSCH, a PDCCH, an EPDCCH, or a PDSCH is transmitted/received".

In addition, hereinafter, the expression "a PDCCH is transmitted/received, or a signal is transmitted/received through a PDCCH" includes "an EPDCCH is transmitted/received, or a signal is transmitted/received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present invention, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission/reception of a signal through each channel will be described as transmission/reception of a corresponding channel.

In a situation where terminals having improved mobility, such as a smart phone and a tablet PC, have been increased, the amount of data required by terminals has been rapidly increased. In a condition where such a large amount of data is required, there is a limitation in providing data through an existing single base station. Therefore, a technique to provide data to a terminal through a plurality of base stations or a plurality of cells has been developed.

A number of methods for increasing the speed of data transmission/reception and transmitting a large amount of data have been considered. Examples of such methods include a Carrier Aggregation technique for aggregating different frequency bands provided by one base station so as to use the same simultaneously, a technique for using a plurality of antennas to increase the efficiency of frequencies and improve communication stability (for example, MIMO), a technique to control interference through the cooperation among neighboring base stations so as to improve throughput, and a small cell technique for improving the recycling rate of frequencies such that the same frequencies are regionally and more frequently used.

Among described techniques to which the present invention may be applied, simple descriptions with respect to the carrier aggregation technique and the small cell technique are provided.

The carrier aggregation technique means communication using different frequency bands simultaneously. Further, in LTE-Advanced, the carrier aggregation technique for defining carriers defined in LTE as component carriers (CCs) and aggregating the CCs so as to use the same simultaneously has been required. A terminal may use a plurality of carriers simultaneously and communicate with a plurality of cells or base stations, in the carrier aggregation technique.

The small cell means a cell having a relatively narrow coverage in comparison with a macro cell provided by an existing base station. Since a plurality of terminals may be concentrated in a narrow area or the amount of data transmission/reception may be increased in a particular region, deployment of a small cell base station has been considered in order to cover the same.

In addition, each of a base station providing a macro cell and a base station providing a small cell may provide one or more cells to a terminal, by using, together, the carrier aggregation technique and the small cell technique described above. The terminal may configure a dual connectivity with the base station providing a macro cell and the base station providing a small cell, through the provided plurality of cells. The dual connectivity means a case where a particular wireless bearer is configured to be split into a plurality of base stations when the terminal is connected with the plurality of base stations to perform communication.

In the present specification, a base station which terminates S1-MME among a plurality of base stations providing a cell to a terminal and provides a PCell that is a reference for handover is referred to as a master base station or a first base station. In addition, a base station which provides, to the terminal, an additional wireless resource is referred to as a secondary or a second base station. Meanwhile, a macro cell is stated to represent one or more cells provided by the first base station, and a small cell is stated to represent one or more cells provided by the second base station. These are for ease of description and may not be associated with the size of cells. Hereinafter, for ease of description, it is described that the terminal performs communication using the dual connectivity with two base stations which are the first base station and the second base station, or the carrier aggregation technique, but more base stations may be further included. Alternatively, the carrier aggregation technique using a plurality of cells provided by one base station may be also available.

Figure 1:
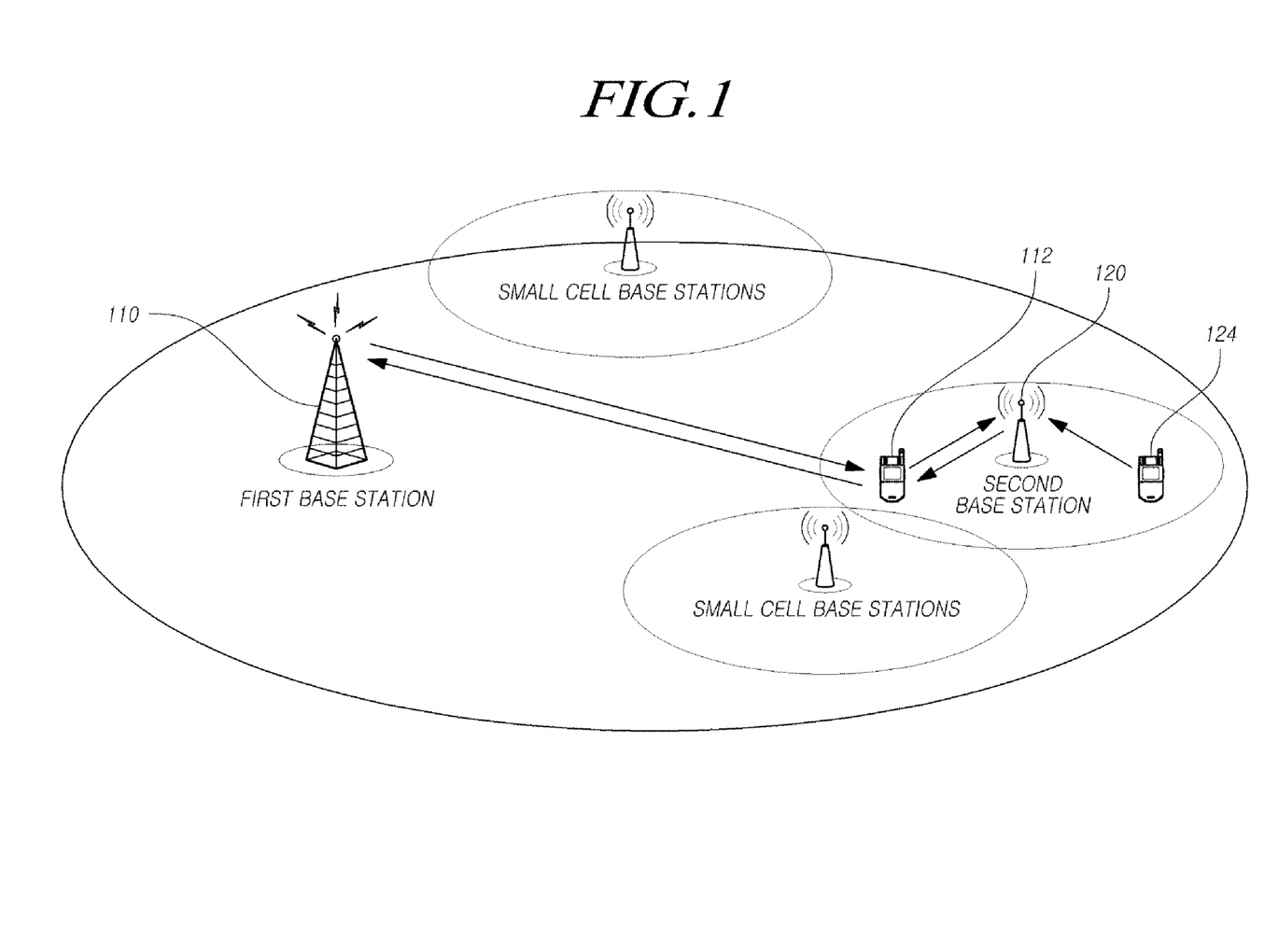
FIG. 1 is a drawing illustrating an example of a deployment scenario of a small cell base station, to which the present invention may be applied.

FIG. 1 is a drawing illustrating an example of a small cell deployment scenario.

In a small cell deployment environment like FIG. 1, a plurality of small cell base stations may be deployed within the coverage of one master base station 110. In this case, a terminal 112 may perform communication with a first base station 110 and a second base station 120 through the carrier aggregation technique or the dual connectivity described above. Meanwhile, a terminal 124 located within the coverage of the second base station 120 may perform communication only with the second base station 124.

Meanwhile, in a situation where the plurality of small cell base stations are deployed as above, there may occur problems of waste of power and signal interference among the small cell base stations. That is, there may be a case where no terminal for communicating with the small cell base stations is present within the coverage of the small cell base stations. Such problems may occur frequently when the coverage of the small cell base stations is narrow.

Therefore, a method for configuring the small cell base stations to be in a deactivation state (off state) when communication through the small cell base stations is not performed and configuring, when required, the small cell base stations to be in an activation state (on state) is necessary. In addition, a method for checking, by the terminal, the small cell base stations in a deactivation state is also necessary. In other words, it is also necessary that the terminal receives a discovery signal from the small cell base stations in a deactivation state, measures the quality of the received discovery signal, and performs a switch for the small cell base stations in a deactivation state to be in an activation state when necessary, so as to perform communication.

Discovery Signal

A small cell may transmit a discovery signal (discovery reference signal, DRS) for a terminal in a deactivation state. The terminal may receive a corresponding DRS and check a corresponding small cell.

In other words, the small cell base stations may change the state thereof to a deactivation state when a terminal requiring communication is not present within the corresponding cell. Through this, power consumption may be prevented and a problem of signal interference may be decreased, in an environment where the small cell base stations are densely deployed.

However, a method by which the terminal may be able to check the presence of the small cell base stations in a deactivation state is necessary. Since a case where the small cell base stations are in a deactivation state corresponds to a situation where a signal for a general signal quality has not been transmitted, transmission of the discovery signal for checking, by the terminal, the small cell is necessary. That is, the small cell base stations in a deactivation state may transmit the discovery signal periodically or when an event occurs.

In other words, when the small cell is in a deactivation state, a reference signal, such as a general CRS for RRM measurement, is not transmitted. Therefore, the terminal which has entered the coverage of the small cell may not be able to check the small cell. Accordingly, the small cell may transmit the DRS for the terminal, in a deactivation state.

Figure 2:
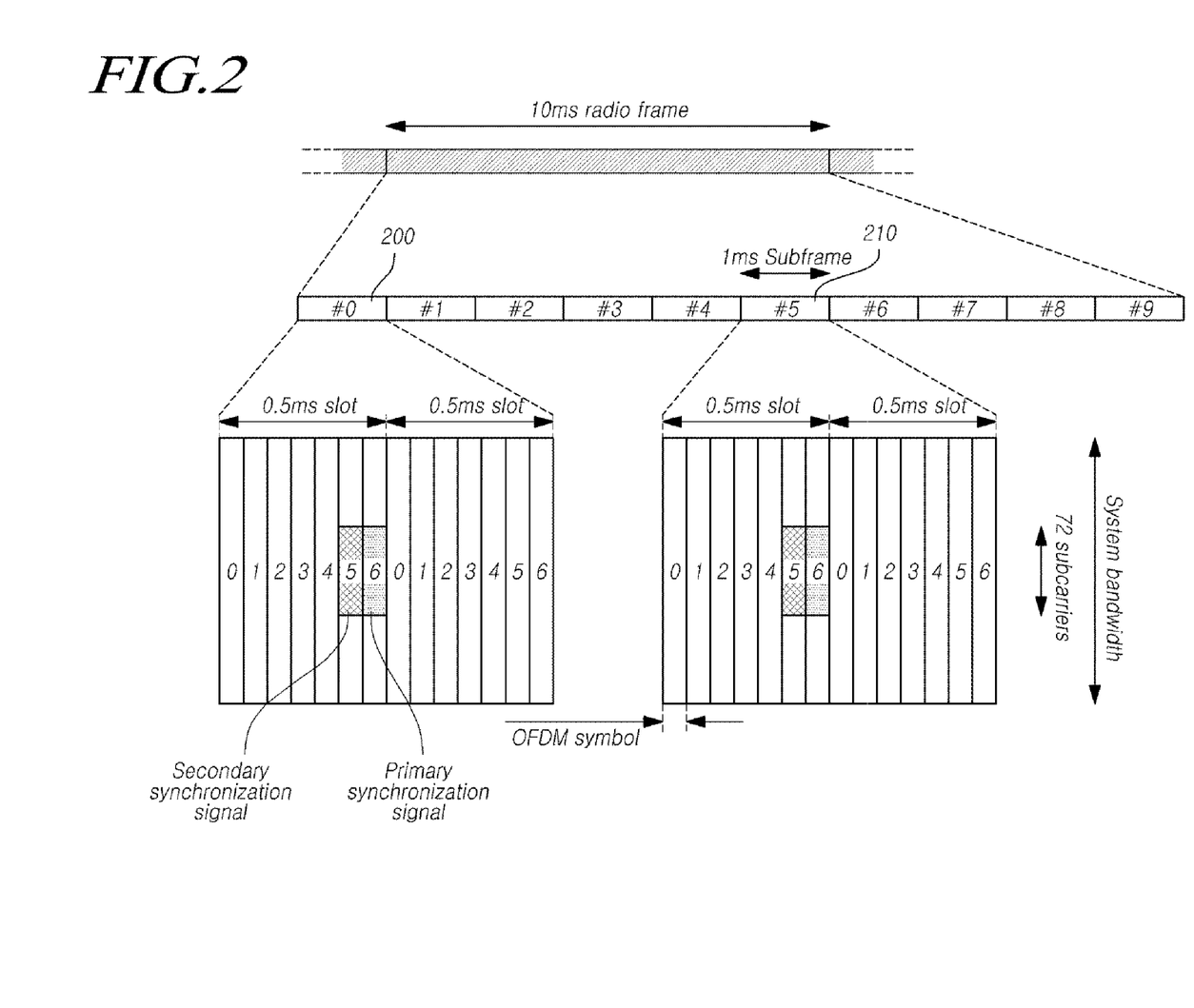
FIG. 2 is a drawing illustrating an example of transmitting PSS and SSS according to an embodiment of the present invention.

FIG. 2 is a drawing illustrating an example of transmitting PSS and SSS according to an embodiment of the present invention.

A discovery signal (DRS) according to an embodiment of the present invention may include a Primary Synchronization Signal (PSS), a Secondary Synchronization Signal (SSS), and a Cell specific Reference Signal (CRS). The Primary Synchronization Signal (PSS) and the Secondary Synchronization Signal (SSS) are signals to be transmitted for synchronization between a cell and a terminal, and may be transmitted as elements of the discovery signal. Further, the CRS is a cell-specific reference signal (reference signal), and may be transmitted as an element of the discovery signal.

Referring to FIG. 2, one radio frame may have ten subframes. Meanwhile, one subframe may have two slots, and one slot may have six or seven OFDM symbols. In FIG. 2, for example, one slot is assumed to have six OFDMs. In a case of an extended cyclic prefix, six OFDMs may be included.

For example, the PSS and SSS which are included in the DRS may be transmitted in subframes 0 and 5 200, 210. Alternatively, the PSS and SSS may be transmitted through one or more subframes among subframes 0 to 9. Alternatively, the PSS and SSS may be transmitted through only one of the subframes 0 to 9.

If the PSS and SSS are transmitted through subframe 0 200 and subframe 5 210, the transmission may be available only through some symbols among 14 symbols.

Figure 3:
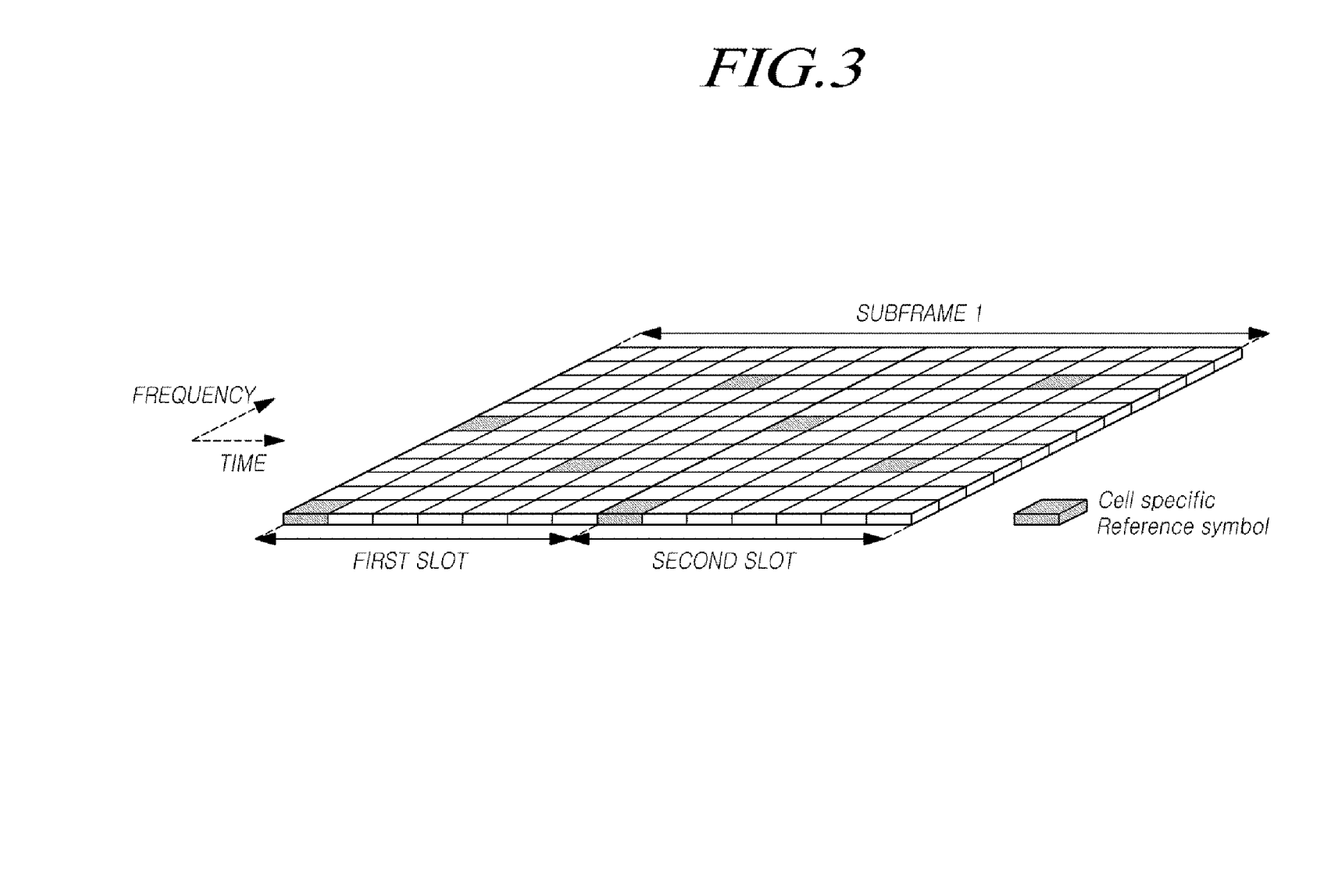
FIG. 3 is a drawing illustrating an example of transmitting a CRS according to an embodiment of the present invention.

FIG. 3 is a drawing illustrating an example of transmitting a CRS according to an embodiment of the present invention.

A CRS included in a DRS according to an embodiment of the present invention may be transmitted in a pattern as in FIG. 3. That is, the CRS may be transmitted to a first slot and a second slot in a subframe, using some resource blocks. FIG. 3 illustrates an example where a resource block to which the CRS is transmitted has a rhombus shape. In addition, the CRS may be allocated to a resource block in various forms, for transmission.

An existing CRS is transmitted through all subframes, but the CRS in the present invention is transmitted only through some subframes in a frame. That is, the CRS included in the DRS may decrease transmission power of the small cell base stations in a deactivation state, and may be transmitted only through some subframes in order to minimize the interference between signals.

In the present specification, a PSS, an SSS, and a CRS are described to constitute a DRS, but a PSS, SSS, and CRS for a DRS may also be used with the same meaning.

Meanwhile, the DRS may include, in a terminal, information enabling to check the presence of a small cell and information for measuring the signal quality of the small cell.

As described above, the DRS may include the PSS and SSS. Through this, the terminal may receive the DRS and check the small cell. Also, the DRS may include the CRS and/or the CSI-RS. Through this, the terminal may measure the signal quality of the small cell. The terminal may transmit the measured information to a base station which maintains an RRC connection state such that the corresponding base station may determine to switch the state of the small cell to an activation state.

In summary, the DRS may include the PSS, the SSS, and the CRS. Alternatively, the DRS may include the PSS, the SSS, the CRS, and the CSI-RS. The terminal may receive information on which a signal between the CRS and the CSI-RS is included in the DRS from the base station having configured the RRC connection. Alternatively, the terminal may include configuration information on the PSS, the SSS, the CRS, and the CSI-RS, and recognize which signal is transmitted to the DRS, based on indication information received from the base station.

Change in DRS Mapping

As described above, the DRS of the present invention may have a PSS, an SSS, and a CRS. Meanwhile, in relation to an existing CRS, transmission has been performed through every subframe in a full time-and-frequency band. On the other hand, since the DRS is a signal transmitted in order to reduce the power reduction of a small cell and a terminal and to reduce an unnecessary measuring operation, transmission in all subframes may be squandering.

Therefore, a transmission method of the PSS, SSS, and CRS included in the DRS of the present invention is required to change.

For example, the CRS may be configured to have the same period, offset, or duration as that of the PSS and SSS, to be included in the DRS. That is, there may be a case where the CRS is transmitted together with the PSS and SSS.

For another example, the PSS and SSS may be transmitted in one subframe within one radio frame, and the CRS may also be transmitted in only one subframe within one radio frame. Alternatively, the CRS may be continuously transmitted in subframes including the same subframe as that in which the PSS and SSS are transmitted and a subframe which is before or after the same.

For another example, a transmission configuration including transmission periods, offsets, and durations of the PSS and SSS may be newly configured for the DRS, and, even in this case, the CRS may have the same or similar configuration as the newly configured transmission configuration of the PSS and SSS, for transmission. For example, a period of the CRS may be configured to be the same as the newly configured periods of the PSS and SSS. In the same way, other transmission configurations may also be configured to be the same as or similar, for transmission. That is, the CRS included in the DRS may be transmitted only in the subframe in which the PSS and SSS are transmitted. Alternatively, the CRS included in the DRS may be transmitted in subframes including the subframe in which the PSS and SSS are transmitted and a predetermined number of continuous subframes which proceed or follow the same. The predetermined number may be equal to or smaller than five.

Meanwhile, a relative position of the PSS/SSS included in the DRS may be changed. That is, the SSS and PSS may be transmitted in adjacent subframes, or transmitted having a specific time difference. Alternatively, the PSS may be transmitted first, and then the SSS may be transmitted later. Further, the PSS and SSS may be transmitted at almost the same time or may be transmitted having a specific time difference. In other words, absolute or relative positions of subframes, slots, or symbols of the PSS and SSS included in the DRS may be changed to be different from those of the existing PSS and SSS. The CRS may also be changed based on the configurations of the PSS and SSS included in the DRS described above.

In terms of frequency, the CRS included in the DRS may be transmitted only in some bands, not in the full frequency band.

Alternatively, the CRS included in the DRS may be transmitted in the same subframe as that in which the PSS and SSS are transmitted, and may be transmitted using a resource block configured such that the CRS is not overlapped with the PSS and SSS.

Hereinbefore, the description has been made mainly for the CRS. However, when a CSI-SI is included in the DRS, the transmission method may be changed for the CSI-RS using the same method as that for the CRS.

Hereinafter, a description will be made mainly for operations of the terminal and the base station, in relation to the discovery signal transmission described above.

Figure 4:
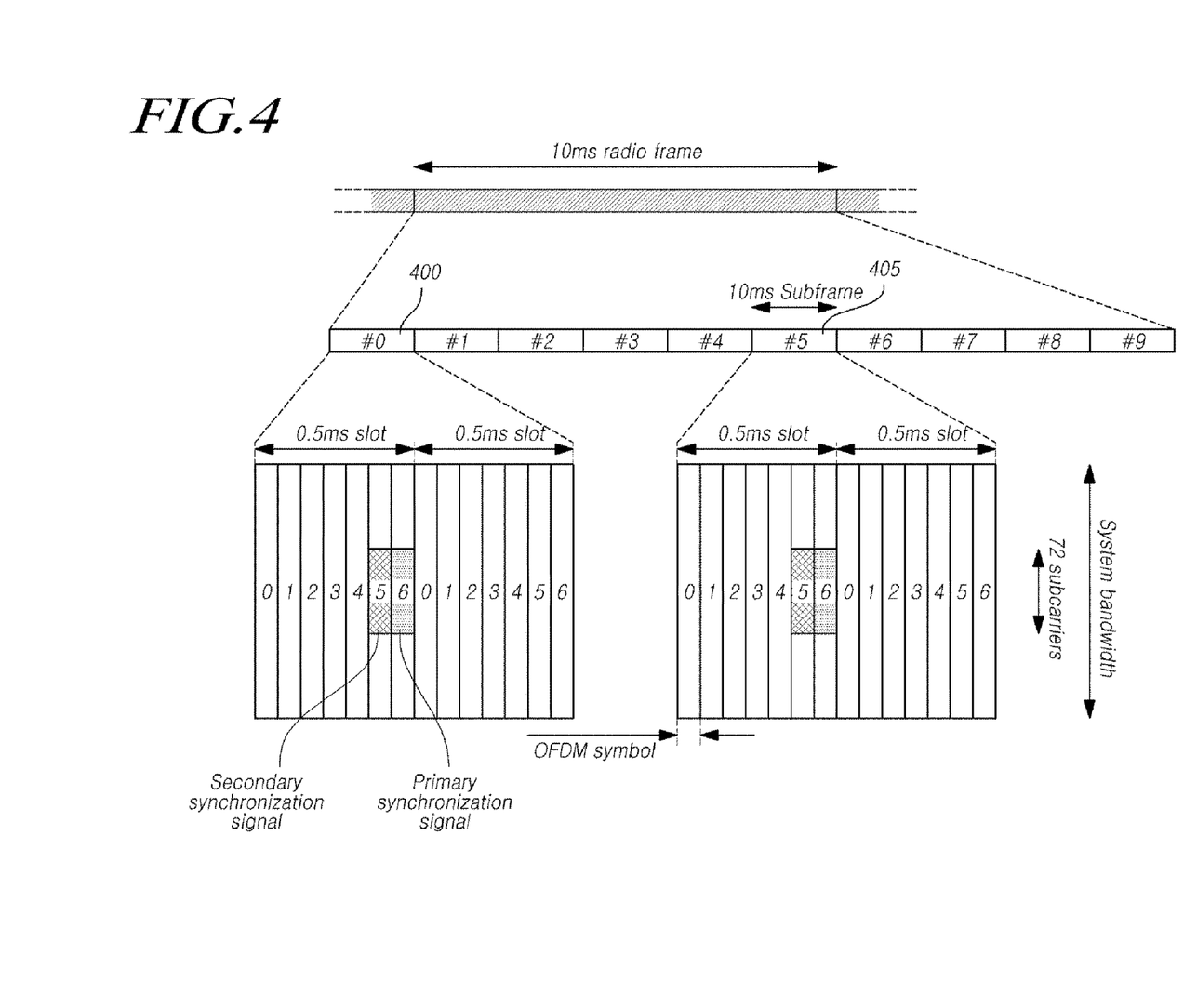
FIG. 4 is a drawing for describing a subframe to which a discovery signal is transmitted according to an embodiment of the present invention.

FIG. 4 is a drawing for describing a subframe to which a discovery signal is transmitted according to an embodiment of the present invention.

A method by which a terminal measures a discovery signal according to an embodiment of the present invention may include the steps of: receiving a discovery signal from a small cell base station in a deactivation state; and measuring the discovery signal based on a reference signal of the discovery signal including a Primary Synchronization Signal (PSS), a Secondary Synchronization Signal (SSS), and a Cell specific Reference Signal (CRS).

Referring to FIG. 4, the terminal may receive the discovery signal transmitted by the small cell base station in a deactivation state. The terminal may measure the signal quality of the discovery signal based on the received discovery signal.

As described above, the small cell base station in a deactivation state may transmit the DRS wherein the DRS includes a PSS, a SSS, and a CRS. The PSS and SSS included in the DRS received by the terminal may be received only in one subframe in one frame. Alternatively, the PSS and SSS may be received in two subframes in one frame.

Meanwhile, the CRS included in the DRS received by the terminal may be received, at least, in the same subframe as that for the PSS and SSS. For example, the CRS may be received only in a specific subframe in which the PSS and SSS are received, and may not be received through all subframes.

Alternatively, the CRS included in the DRS received by the terminal may be received only in a predetermined number of continuous subframes including the subframe in which the PSS and SSS are transmitted. Meanwhile, the predetermined number of continuous subframes may be configured to be equal to or smaller than five.

Referring to FIG. 4, the terminal may receive the PSS and SSS through subframe 0 400 and subframe 5 405 in one frame. Further, only subframe 0 400 and subframe 5 405 may receive the CRS. That is, in FIG. 4, the CRS 410 may receive allocation of a resource block only in the subframe in which the PSS and SSS are received, for transmission. In this case, the allocated resource block may have a consecutive rhombus shape. However, the CRS resource block may be allocated such that resource blocks of the PSS and SSS are not overlapped therewith.

Figure 5:
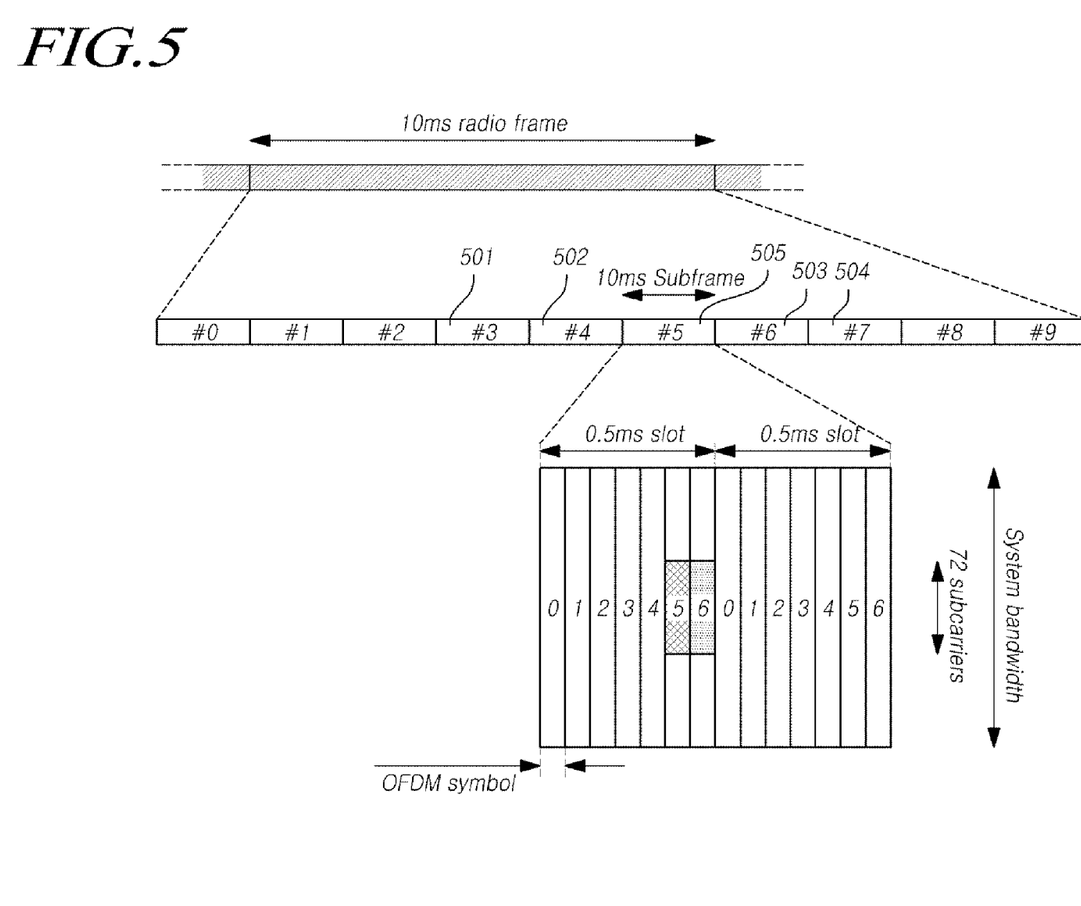
FIG. 5 is a drawing for describing a subframe to which a discovery signal is transmitted according to another embodiment of the present invention.

FIG. 5 is a drawing for describing a subframe to which a discovery signal is transmitted according to another embodiment of the present invention.

Referring to FIG. 5, a case where the DRS is received only through one subframe in one frame is described. The terminal may receive the PSS and SSS included in the DRS only in subframe 5 505. As described above, the CRS included in the DRS may be received through the same subframe as the subframe 505 in which the PSS and SSS are received. That is, the resource block 510 receives allocation of the CRS such that resource blocks of the PSS and SSS are not overlapped therewith and may be transmitted through subframe 5 505.

Meanwhile, the CRS may be received only in a predetermined number of continuous subframes including the subframe in which the PSS and SSS are transmitted. Further, the predetermined number of continuous subframes may be configured to be equal to or smaller than five.

That is, when the PSS and SSS are received through subframe 5, the CRS may be received through subframes 501 to 505.

In other words, the CRS may include the subframe in which the PSS and SSS are received, and may be received in N number of continuous subframes. Here, N may be configured to be equal to or smaller than five.

The DRS may have a predetermined period for reception. For example, the DRS may be received every 40 ms or a period of an even multiple of 40 ms. Particularly, the DRS may be received every four frames, i.e., the period of 40 ms, and may be transmitted in the period configured to be the even multiple of 40 ms, such as 80 ms, 160 ms, or 320 ms. Such a period may be configured to be different for each small cell base station, and may be configured to be the same. When the period is configured to be the same, a predetermined offset may be used for a control to prevent interference from being occurred.

Meanwhile, the DRS may further include a Channel State Information Reference Signal (CSI-RS). When the CSI-RS is included in the DRS for transmission, the terminal may receive, through upper layer signaling, information which notifies that the CSI-RS is configured for discovery. The CSI-RS may be used to measure the signal quality of the small cell base station in a deactivation state.

The terminal may include a step for measuring the quality of the small cell base station using the received DRS. For example, in the step for measuring the discovery signal, Reference Signal Received Power (RSRP) or Reference Signal Received Quality (RSRQ) may be measured based on the CRS or the CSI-RS when the discovery signal further includes the CSI-RS. For another example, the terminal may measure the RSRP or the RSRQ based on the CRS when the CRS only is included for reception.

The terminal may determine a connection with the small cell base station which transmits the corresponding discovery signal, based on the measured RSRP or RSRQ result. Alternatively, the terminal may transmit the measurement result of the RSRP or RSRQ to the base station having formed an RRC connection, and the base station having received the measurement result may determine whether the small cell base station having transmitted the corresponding discovery signal is activated, based in the measurement result.

In addition, before the step for receiving the discovery signal, the terminal may further include a step for receiving measurement configuration information associated with the discovery signal from the base station having formed an RRC connection. The measurement configuration information may include one or more information among whether the discovery signal has the CSI-RS, a measurement period, a measurement gap, and offset information for measurement. The terminal may measure the discovery signal received based on the received measurement configuration information.

DRS Configuration

Meanwhile, the DRS may configure a transmission configuration including a transmission period, offset, and the like to be different for each small cell or each small cell group controlled by the small cell or one base station. That is, when each terminal receives a DRS in an environment established by small cells concentrated therein, the DRS transmission configuration may be differently configured in order to prevent interference or excessive subframe monitoring.

For an example, a period of a specific small cell or small cell group may be configured as a first period for transmission, and a period of another small cell or small cell group may be configured as a second period. Alternatively, despite of having the same period, offset values may be differently configured.

In this case, the terminal may receive information associated with the DRS configuration from the base station having formed an RRC connection, so as to perform signal measurement, to the corresponding DRS configuration, for receiving the DRS.

Small Cell On/Off Switching

The terminal may acquire information on an activation state of a small cell.

For example, the terminal may receive indication information (indicator) which indicates, to a DCI format, whether a small cell is activated, from the base station having formed an RRC connection. Alternatively, the terminal may receive indication information by a specific reference signal. Alternatively, the terminal may recognize indication information by an existing or new DRX procedure. Alternatively, the terminal may recognize indication information by an improved carrier aggregation activation/deactivation command.

Further, the terminal may be required to recognize an activation state of a corresponding small cell even when the small cell is added as an SCell.

For example, the terminal may add a small cell as an SCell. The added small cell may be configured to be in a deactivation state, and may be switched to be in an activation state by MAC CE. The corresponding small cell may be changed to be in a deactivation state when the terminal performs data communication with a PCell having formed an RRC connection, and the base station of the PCell determines that the small cell of the SCell needs to be switched to be in a deactivation state based on information including data overload of the terminal or a signal quality report of the small cell received from the terminal.

Here, the base station of the PCell may transmit, to the terminal, indication information which indicates a state of the small cell, and the indication information may be available through various described methods. For example, DCI information may include information on whether the small cell is activated, as one-bit information, and the terminal, in this case, may recognize that the small cell of the SCell is in a deactivation state after K-th subframe (K is a natural number greater than 0) which includes the corresponding DCI information.

Through this, the terminal may recognize that the SCell configured to be in an activation state is in a deactivation (off) state, so as to stop signal transmission/reception using the corresponding SCell.

In the same way, the base station may switch the small cell to be in an activation state, and may transmit the corresponding information to the terminal.

Further, the described DCI information may further include information on a duration of the activation or deactivation state of the small cell. For example, the DCI information may include information indicating that the corresponding small cell is in a deactivation state, and the number of subframes during which the corresponding deactivation state has been maintained. Alternatively, the corresponding information may be configured to have a table form in the terminal and information indicating a specific value in the table may be included.

Meanwhile, the duration of the activation or deactivation state of the small cell may be configured such that the duration is not allowed to exceed a transmission period of the DRS or CSI-RS. That is, since the ambiguity between a signal including the DRS and state information may be generated, wherein the DRS is received when the duration for the deactivation state of the small cell received by the terminal exceeds the DRS or CSI-RS period, the duration may be configured not to exceed the DRS or CSI-RS period so as to prevent off-subframe from being maintained.

DRS Measurement

As described above, the DRS may include the CRS and/or CSI-RS for signal quality measurement.

In this case, a terminal having entered the coverage of the small cell for the first time or a small cell is configured as an SCell as described above, but the terminal, when switched to a deactivation state, may receive the DRS and perform a signal measurement operation.

The terminal may receive measurement configuration information for DRS measurement of the small cell (for example, a measurement period, a measurement gap, an offset for measurement, and so on) from the SCell configured to be primary among the base station having configured an RRC connection, the PCell, and the SCell.

The terminal may perform a DRS measurement operation based on the received measurement configuration information.

For example, when the DRS is transmitted in a period of 200 ms, the terminal may receive and measure the DRS in the measurement gap configured in the period of 200 ms. Further, the DRS may be received and measured only in the subframe configured by a specific offset of the measurement gap.

The terminal, as described above, may measure the RSRP/RSRQ using the CRS and/or CSI-RS which may be included in the DRS.

The terminal may transmit the measured DRS measurement result information to the base station having configured an RRC connection. The base station may determine whether the corresponding small cell is activated with reference to the received DRS measurement result information, data overload information, and the like.

As described hereinabove, in the present invention, the small cell may transmit the DRS in a deactivation state, and the PSS/SSS and the CRS and/or the CSI-RS, which are included in the DRS, may have transmission configurations, including periods thereof, changed to be the same as or similar to each other, for configuration.

The terminal may receive and measure the DRS when the small cell is in a deactivation state even in a case where the small cell is configured as the SCell, and the base station may control whether the small cell is activated based on the corresponding measurement result, overload information, and the like.

Further, the terminal may recognize information associated with an activation state of the small cell, from the base station having formed an RRC connection. In this case, the terminal having added the small cell as the SCell may dynamically receive the information according to the activation or deactivation of the small cell, so as to use a wireless resource of the small cell. This supports an efficient use of wireless resources, by adding an existing small cell as an SCell, cancelling the adding of the small cell when not in use, and simply repeating a series of the adding when reusing the same.

An example of operations by which the terminal and the base station may perform all the embodiments of the present invention is described.

Figure 6:
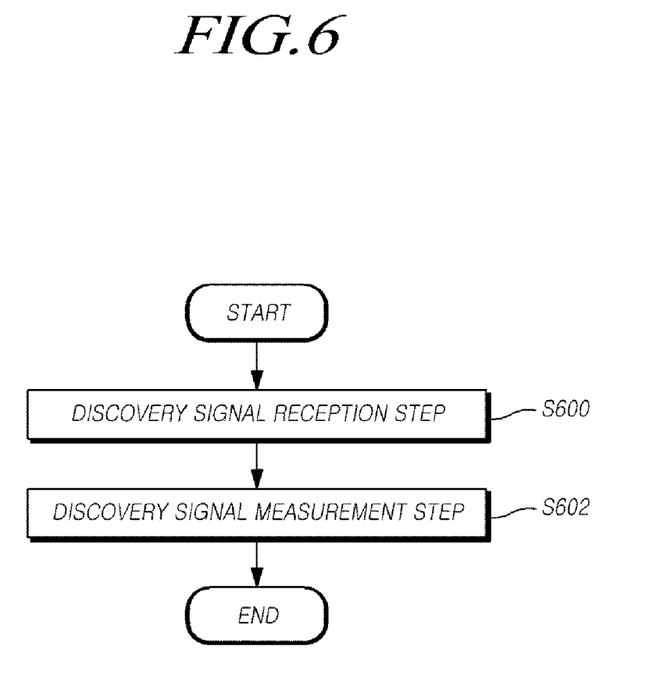
FIG. 6 is a drawing for describing an operation of a terminal according to another embodiment of the present invention.

FIG. 6 is a drawing for describing an operation of a terminal according to another embodiment of the present invention.

A method by which a terminal measures a discovery signal according to another embodiment of the present invention, the method including a step for receiving a discovery signal from the small cell base station in a deactivation state S600. The discovery signal may include a CRS, a PSS, and an SSS. Alternatively, the discovery signal may further include a CSI-RS.

The PSS and SSS may be received in only one subframe in one frame. Further, the CRS may be received, at least, in the same subframe as that in which the PSS and SSS are received, and may be received only in a predetermined number of continuous subframes including the subframe in which the PSS and SSS are transmitted. The predetermined number of continuous subframes may be configured to be equal to or smaller than five.

Further, the discovery signal may be received every 40 ms or a period of an even multiple of 40 ms.

The terminal may include a step for measuring the discovery signal based on a reference signal of the discovery signal including a Primary Synchronization Signal (PSS), a Secondary Synchronization Signal (SSS), and a Cell specific Reference Signal (CRS) S602. The terminal may measure signal quality based on the CRS when the CRS is included in the discovery signal. For another example, when the discovery signal further includes a CSI-RS, the terminal may measure Reference Signal Received Power (RSRP) or Reference Signal Received Quality (RSRQ) based on the CRS or the CSI-RS.

Meanwhile, before the step for receiving the discovery signal, the terminal may further include a step for receiving measurement configuration information associated with the discovery signal from the base station having formed an RRC connection. The measurement configuration information may include one or more information among whether the discovery signal has the CSI-RS, a measurement period, a measurement gap, and offset information for measurement. The terminal may measure the discovery signal based on the measurement configuration information.

Figure 7:
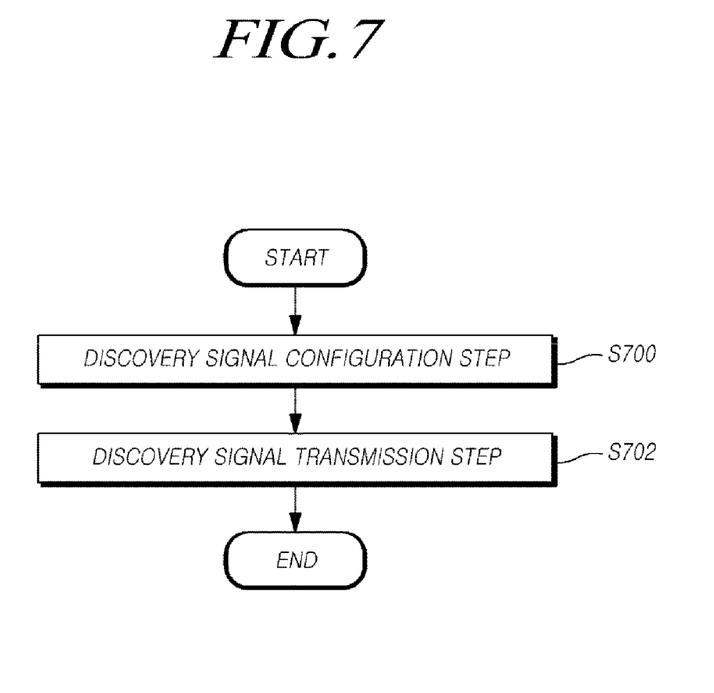
FIG. 7 is a drawing for describing an operation of a small cell base station according to another embodiment of the present invention.

FIG. 7 is a drawing for describing an operation of a small cell base station according to another embodiment of the present invention.

A method by which a base station transmits a discovery signal according to another embodiment of the present invention, the method including a step for configuring a discovery signal including a Primary Synchronization Signal (PSS), a Secondary Synchronization Signal (SSS), and a Cell specific Reference Signal (CRS) S700. The discovery signal may include the CRS, the PSS, and the SSS. Alternatively, the discovery signal may further include a CSI-RS.

The base station may include a step for transmitting the discovery signal in a deactivation state of the base station S702. The PSS and SSS may be transmitted only in one subframe within one frame. Meanwhile, the CRS may be transmitted, at least, in the same subframe as that in which the PSS and SSS are transmitted, and may be transmitted in a predetermined number of continuous subframes including the subframe in which the PSS and SSS are transmitted. The predetermined number of continuous subframes may be configured to be equal to or smaller than five. The discovery signal may be transmitted every 40 ms or a period of an even multiple of 40 ms.

In addition, the terminal and the base station may perform all operations necessary to perform the described operations.

The terminal and the base station for performing all the described operations may be configured as follows.

Figure 8:
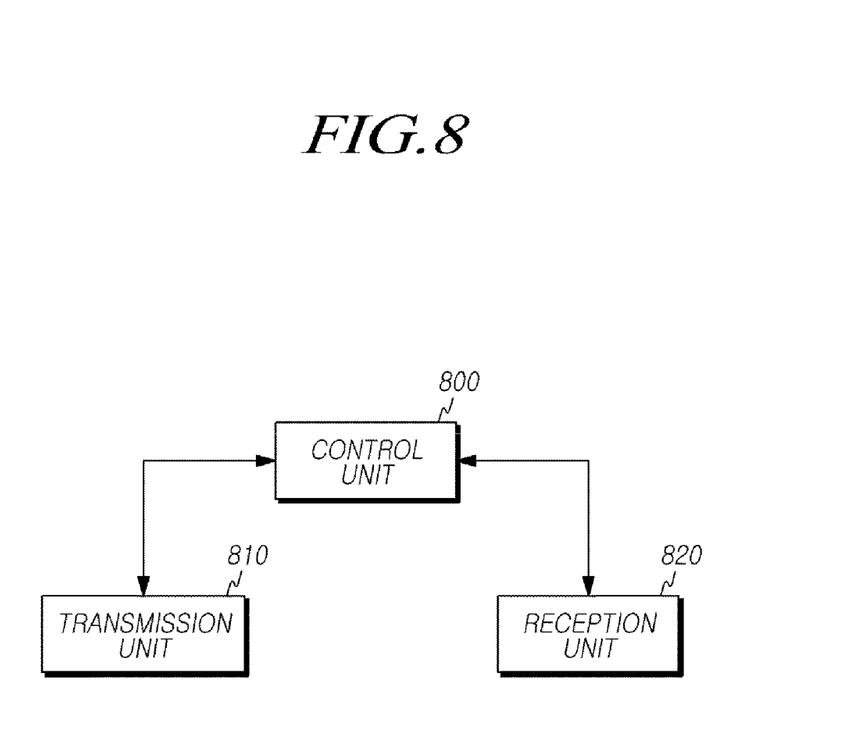
FIG. 8 is a diagram illustrating a configuration of a terminal according to another embodiment of the present invention.

FIG. 8 is a diagram illustrating a configuration of a terminal according to another embodiment of the present invention.

Referring to FIG. 8, the terminal according to another embodiment of the present invention includes a control unit 800, a transmission unit 810, and a reception unit 820.

The control unit 800 may measure a discovery signal based on a reference signal of the discovery signal including a Primary Synchronization Signal (PSS), a Secondary Synchronization Signal (SSS), and a Cell specific Reference Signal (CRS).

The reception unit 820 may receive the discovery signal from the small cell base station in a deactivation state.

Further, the transmission unit 810 and the reception unit 820 may be used for transmitting/receiving a signal, message or data necessary for performing the present invention described above to/from the small cell base station or the base station having configured an RRC connection.

Figure 9:
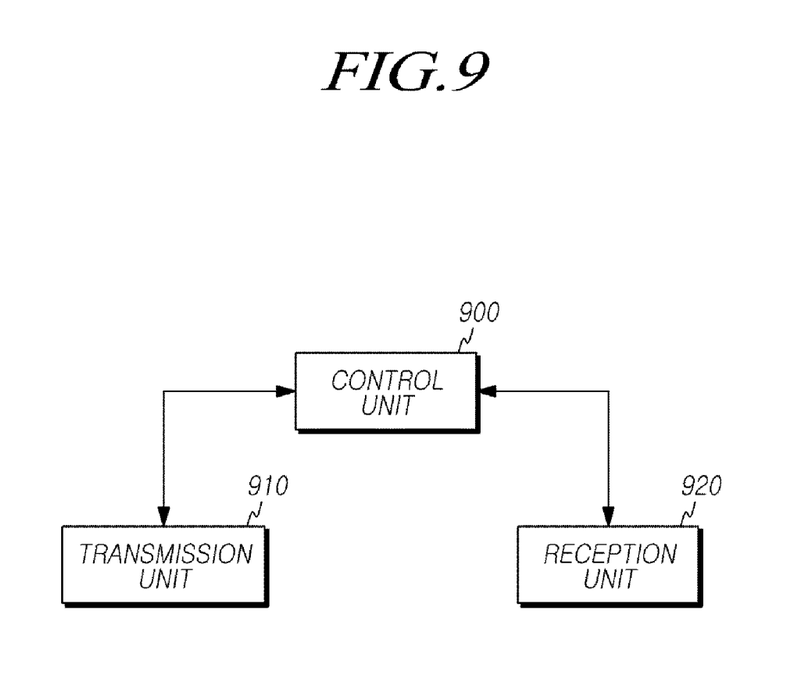
FIG. 9 is a diagram illustrating a configuration of a small cell base station according to another embodiment of the present invention.

FIG. 9 is a diagram illustrating a configuration of a small cell base station according to another embodiment of the present invention.

Referring to FIG. 9, a small cell base station according to another embodiment of the present invention includes a control unit 900, a transmission unit 910, and a reception unit 920.

The reception unit 920 may receive data, a signal, and a message from the terminal or another base station.

Further, the control unit 900 may configure a discovery signal including a Primary Synchronization Signal (PSS), a Secondary Synchronization Signal (SSS), and a Cell specific Reference Signal (CRS), which are necessary for performing the present invention described above. In addition, the control unit 900 controls an operation of the base station, which is necessary for performing the present invention described above.

The transmission unit 910 may transmit the discovery signal in a deactivation state of the base station. In addition, the transmission unit 910 may transmit data, a signal, and a message to the terminal or another base station.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, exemplary aspects of the present invention have not been described for limiting purposes. The scope of the present invention shall be construed on the basis of the accompanying claims in such a manner that all of the technical ideas included within the scope equivalent to the claims belong to the present invention.

CROSS-REFERENCE TO RELATED APPLICATION

This application is a U.S. National Stage Application of International Patent Application No. PCT/KR2015/001173, filed on Feb. 5, 2015, which claims priority from and the benefit under 35 U.S.C. §119(a) of Korean Patent Application Nos. 10-2014-0049214, filed on Apr. 24, 2014 and 10-2014-0097010, filed on Jul. 30, 2014 which are hereby incorporated by reference for all purposes as if fully set forth herein. Also, when this application claims the priority benefit of the same Korean Patent Applications from countries in addition to the U.S., the invention will be incorporated herein by reference.

The invention claimed is:

1. A method by which a terminal measures a discovery signal, the method comprising:
   receiving the discovery signal including a Primary Synchronization Signal (PSS), a Secondary Synchronization Signal (SSS), and a Cell Specific Reference Signal (CRS) from a small cell base station in a deactivated state;
   measuring the discovery signal from the small cell base station in the deactivated state based on a reference discovery signal;
   receiving a measurement configuration information associated with the discovery signal from a base station that has formed a Radio Resource Control (RRC) connection; and
   receiving downlink control information that includes information on a duration of the deactivated state of the small cell base station,
   wherein the measurement configuration information is received before receiving the discovery signal,
   wherein the measurement configuration information includes information as to whether a CSI-RS is present,
   wherein the CRS is received only in a predetermined number of continuous subframes including a subframe in which the PSS and SSS are transmitted,
   wherein predetermined number of continuous subframes is configured to be equal to or smaller than five, but more than one, and
   wherein the information on the duration of the deactivated state includes a number of subframes during which the small cell base station has been deactivated.

2. The method of claim 1, wherein the PSS and SSS are received only in one subframe of one frame.

3. The method of claim 1, wherein the CRS is received, at least, in the same subframe as that for the PSS and SSS.

4. The method of claim 1, wherein the discovery signal is received every 40 millisecond (ms) or a period of an even multiple of 40 ms.

5. The method of claim 1, wherein the discovery signal further includes a Channel State Information Reference Signal (CSI-RS).

6. The method of claim 5, wherein measuring of the discovery signal comprises measuring Reference Signal Received Power (RSRP) and Reference Signal Received Quality (RSRQ), based on the CRS or the CSI-RS when the discovery signal further includes the CSI-RS.

7. The method of claim 1, wherein the measurement configuration information further includes one or more information among a measurement period, a measurement gap, and offset information for measurement.

8. A terminal for measuring a discovery signal, comprising:
   a receiver that receives the discovery signal including a Primary Synchronization Signal (PSS), a Secondary Synchronization Signal (SSS), and a Cell specific Reference Signal (CRS) from a small cell base station in a deactivated state, receives a measurement configuration information associated with the discovery signal from a base station that has formed a Radio Resource Control (RRC) connection, and receives downlink control information that includes information on a duration of the deactivated state of the small cell base station; and
   a control unit circuitry that measures the discovery signal from the small cell base station in the deactivated state,
   wherein the measurement configuration information is received before the discovery signal is received,
   wherein the CRS is received only in a predetermined number of continuous subframes including a subframe in which the PSS and SSS are transmitted,
   wherein the predetermined number of continuous subframes is configured to be equal to or smaller than five, but more than one, and
   wherein the information on the duration of the deactivated state includes a number of subframes during which the small cell base station has been deactivated.

* * * * *